(12) United States Patent
Belcea et al.

(10) Patent No.: US 8,130,146 B2
(45) Date of Patent: Mar. 6, 2012

(54) METHOD FOR MEASURING THE TIME OF ARRIVAL OF RADIO SIGNALS

(75) Inventors: John M. Belcea, W. Melbourne, FL (US); Pertti O. Alapuranen, Deltona, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 522 days.

(21) Appl. No.: 12/181,727

(22) Filed: Jul. 29, 2008

(65) Prior Publication Data
US 2010/0026576 A1    Feb. 4, 2010

(51) Int. Cl.
*G01S 1/24* (2006.01)
(52) U.S. Cl. ....................................................... 342/387
(58) Field of Classification Search .......... 342/387–394, 342/385; 455/509
See application file for complete search history.

(56) References Cited

U.S. PATENT DOCUMENTS
4,441,192 A * 4/1984 Kita et al. ..................... 375/232
(Continued)

FOREIGN PATENT DOCUMENTS
EP    1464981 B1    11/2007

OTHER PUBLICATIONS

He Huang and Shyhtsun Felix Wu—An Approach to Certificate Path Discovery in Mobile Ad Hoc Networks:—Proceedings of the 1st ACM Workshop Security of Ad Hoc and Sensor Networks—2003—pp. 41-49.

(Continued)

*Primary Examiner* — Thomas Tarcza
*Assistant Examiner* — Nga X Nguyen
(74) *Attorney, Agent, or Firm* — Randi L. Karpinia

(57) ABSTRACT

A method for measuring the time of arrival of radio signals within a network comprises receiving the received signals including at least a first pseudorandom code and a second pseudorandom code from at least one other node; identifying a frequency difference between the node and the other node using a phase difference between each of a maximum value of a cross-correlation provided by the first pseudorandom code and the second pseudorandom code; applying the frequency difference to the reception of the received signal; and calculating the time of arrival of the received signal comprising a time, measured with a local clock, when the cross-correlation has achieved the maximum value.

9 Claims, 5 Drawing Sheets

U.S. PATENT DOCUMENTS

| | | | |
|---|---|---|---|
| 5,371,760 A * | 12/1994 | Allen et al. | 375/142 |
| 6,134,550 A | 10/2000 | Van Oorschot et al. | |
| 7,209,076 B2 * | 4/2007 | Roh | 342/357.59 |
| 7,295,159 B1 | 11/2007 | Belcea et al. | |
| 7,409,220 B2 | 8/2008 | Belcea | |
| 7,433,322 B1 | 10/2008 | Alapuranen | |
| 2002/0118723 A1 | 8/2002 | McCrady et al. | |
| 2003/0014629 A1 | 1/2003 | Zuccherato | |
| 2003/0227895 A1 | 12/2003 | Strutt et al. | |
| 2004/0005902 A1 | 1/2004 | Belcea | |
| 2004/0077357 A1 * | 4/2004 | Nakada | 455/452.1 |
| 2004/0246986 A1 | 12/2004 | Belcea | |
| 2005/0081037 A1 | 4/2005 | Kumatgai et al. | |
| 2005/0154918 A1 | 7/2005 | Engberg | |
| 2007/0127422 A1 | 6/2007 | Belcea | |

OTHER PUBLICATIONS

Almenarez, Carbonell, Forne, Hinarejos, Lacoste, Marin and Montenegro—"Design of an Enhanced PKI for Ubiquitous Networks"—IEEE Computer Society—Proceedings of the 16th International Workshop on Database and Experts Systems Application—2005—5 pages.

Denis Pinkas and R. Housley—"Delegated Path Validation and Delegated Path Discovery Protocol Requirements"—Network Working Group—RFC 3379—2002—15 pages.

PCT/US2009/048541—International Search Report with Written Opinion mailed Feb. 2, 2010 to corresponding international application.

* cited by examiner

METHOD FOR MEASURING THE TIME OF ARRIVAL OF RADIO SIGNALS

FIELD OF THE DISCLOSURE

The present invention relates generally to wireless networks and more particularly to the measurement of the time of arrival of radio signals in wireless networks.

BACKGROUND

The Time Of Arrival (TOA) of radio signals is used by many applications running on wireless networks for synchronizing the network clocks, for measuring the distance between two terminals or for computing terminal position. For providing Location Services without involving Global Positioning System (GPS), a device must be able to accurately measure the Time Of Arrival (TOA) of messages from neighbors.

The accuracy of Location Services (i.e. Geographic, Geocentric or Relative positioning) depends on the accuracy of the measurement of Time Of Arrival. From TOA can be deducted the Time Of Flight (TOF), the Time Difference Of Arrival (TDOA), the clock shift and other time related entities that can be used in specific algorithms for computing the position of an object in relation with others or for synchronizing clocks with very high precision.

Radio signals travel from the transmitter to receiver on one direct path and on several indirect paths. Indirect paths are caused by reflections, refractions and scattering (diffusion) of radio signals. Reflections are caused by radio waves bouncing on flat surfaces like vertical walls, horizontal concrete or asphalt covered surfaces, horizontal body of water, etc. Refractions are changes of the direction of propagation path when the signal travels through anisotropic media. Variations in air temperature, humidity and density cause the phenomenon known as the atmospheric refraction that makes the electromagnetic radiation to follow a curve path. For some terrestrial applications when the relative distances between the transmitter and receiver are small, the effect of refraction of the direct path is smaller that it can be measured therefore it can be ignored. Scattering of radio signals happens when signals travel through objects smaller than the wavelength of the electromagnetic signal, like edges of metallic furniture, edges of buildings, top of mountains, etc.

Indirect signals arrive at receiver later than the direct signal, because their paths are longer than the direct path.

TOA of radio signals can be measured by transmitting an analog impulse or by transmitting a numerical sequence of pseudo-random bits that are used for computing the impulse response.

The analog method of transmitting one radio impulse has the advantage of providing a very clear "view" of the direct and reflected signals, allowing the identification of the time of arrival of each of them with a precision as good as the length of the impulse. The disadvantage of the method consists on the fact that the duration of the impulse is too short to have enough energy for propagating very far. In order to propagate the impulse at practical distances, it is necessary to use very high transmit power. Because the impulse duration is very short, the energy spectrum of the impulse signal is very large, interfering with communications over a large frequency spectrum. This fact restricts the use of analog impulses for measuring practical distances.

The digital method of impulse-response consists in transmitting a sequence of pseudo-random bits (pn). Gold codes are the most used pn sequences because they offer a good autocorrelation. As they arrive at receiver, the bits of the pn sequence are stored in a shifting register that is cross-correlated with the same pn sequence as the one used at transmitter. When all, or almost all received bits match the witness pn sequence, the cross-correlation function has a significant peak and the TOA is computed as the difference between the content of the clock register at that moment and the time needed for transmitting the pn sequence. The method requires very small energy for transmitting the signal at very large distances and offers precision as good as the clock tick. Mathematical methods for computing the TOA with higher precision than one clock tick are presented, for example, in U.S. Pat. No. 7,054,126 to Strutt et al. entitled "System and method for improving the accuracy of time of arrival measurements in a wireless ad-hoc communications network," granted on May 30, 2006, which contents are incorporated by reference herein.

The disadvantage of the method using the pn sequence consists in the difficulty of separating between the TOA of the direct path and the TOA of reflected paths, when the length of the reflected paths is very close to the length of the direct path. Because the clocks of transmitter and receiver do not tick in the same time, each bit of the pn sequence has to be transmitted for at least two clock ticks, or the receiver should sample the signal twice as fast as it is transmitted. It makes sure that a complete received bit matches one bit of the pn witness sequence, not only a fraction of it. At a 32 MHz (Megahertz) clock frequency, each bit is transmitted during two clock ticks, or 62.5 ns (nanoseconds). Therefore, if the direct and one reflected path have a difference of length smaller than 20 m (meters), they cannot be easily identified with the impulse-response method because the time passed between receiving the direct signal and receiving the indirect signal is less than 62.5 ns. The problem becomes even more difficult, if a large number of reflected signals arrive over a long period (hundreds of ns) of time, but at close interval one to another. Such response is characteristic to reflections on very rough surfaces.

Accordingly, there is a need for a method for measuring the time of arrival of radio signals with high accuracy.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
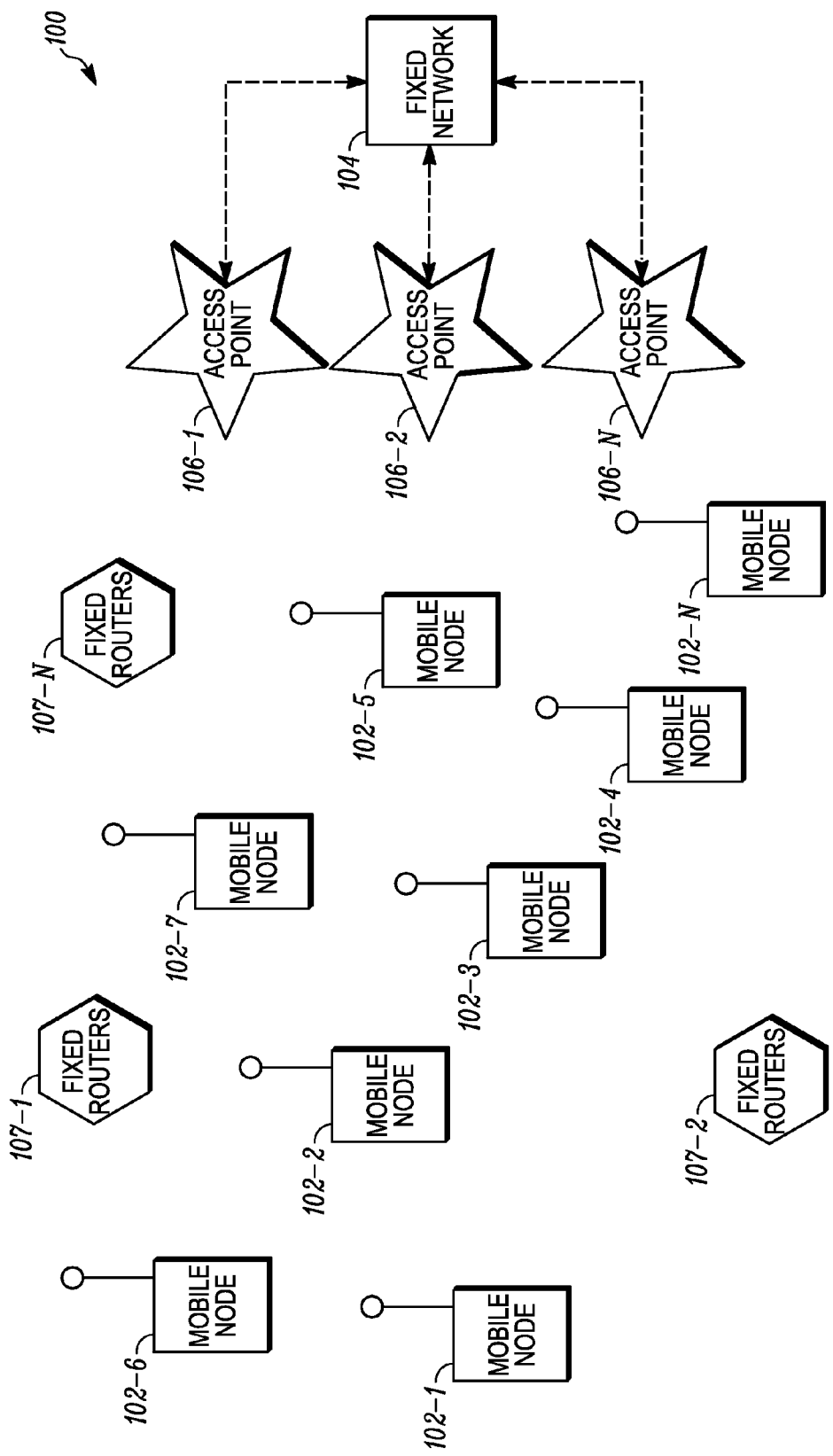
FIG. 1 is a block diagram of an example wireless communications network.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method of operating a node for measuring the time of arrival of a received signal includes receiving the received signal including at least a first pseudorandom code and a second pseudorandom code from an other node; identifying a frequency difference between the node and the other node using a phase difference between each of a maximum value of a cross-correlation provided by the first pseudorandom code and the second pseudorandom code; applying the frequency difference to the reception of the received signal; and calculating the time of arrival of the received signal comprising a time, measured with a local clock, when the cross-correlation has achieved the maximum value.

FIG. 1 is a block diagram illustrating an example of a wireless communication network in which various embodiments of the invention may function. Specifically, FIG. 1 illustrates an ad-hoc packet-switched wireless communications network 100. The network 100, for example, can comprise a mesh enabled architecture (MEA) network or an 802.11 network (i.e. 802.11a, 802.11b, 802.11g, 802.11n or 802.11s). (For these and any IEEE standards recited herein, see: http://standards.ieee.org/getieee802/index.html or contact the IEEE at IEEE, 445 Hoes Lane, PO Box 1331, Piscataway, N.J. 08855-1331, USA.) It will be appreciated by those of ordinary skill in the art that the network 100 in accordance with the present invention can alternatively comprise any packetized communication network where packets are forwarded across multiple wireless hops. For example, the network 100 can be a network utilizing multiple access schemes such as OFDMA (orthogonal frequency division multiple access), TDMA (time division multiple access), FDMA (Frequency Division Multiple Access), or CSMA (Carrier Sense Multiple Access). Additionally, each wireless hop of the mobile ad hoc cognitive network 100 may either employ the same multiple access scheme as the other hops, or a unique multiple access scheme per hop, or alternatively a different access scheme can be used in each direction of a hop.

As illustrated, the network 100 includes a plurality of mobile wireless user terminals 102-1 through 102-n (referred to generally as nodes 102 or mobile nodes 102), and can, but is not required to, include a fixed network 104 having a plurality of access points 106-1, 106-2, ... 106-n (referred to generally as nodes 106 or access points 106), for providing nodes 102 with access to the fixed network 104. The fixed network 104 can include, for example, a core local access network (LAN), and a plurality of servers and gateway routers to provide network nodes with access to other networks, such as other ad-hoc networks, the public switched telephone network (PSTN) and the Internet. The network 100 further can include a plurality of fixed routers 107-1 through 107-n (referred to generally as nodes 107 or fixed routers 107) for routing data packets between other nodes 102, 106 or 107. It is noted that for purposes of this discussion, the nodes discussed above can be collectively referred to as "nodes 102, 106 and 107", or simply "nodes".

As can be appreciated by one skilled in the art, the nodes 102, 106 and 107 are capable of communicating with each other directly, or via one or more other nodes 102, 106 or 107 operating as a router or routers for packets being sent between nodes.

Figure 2:
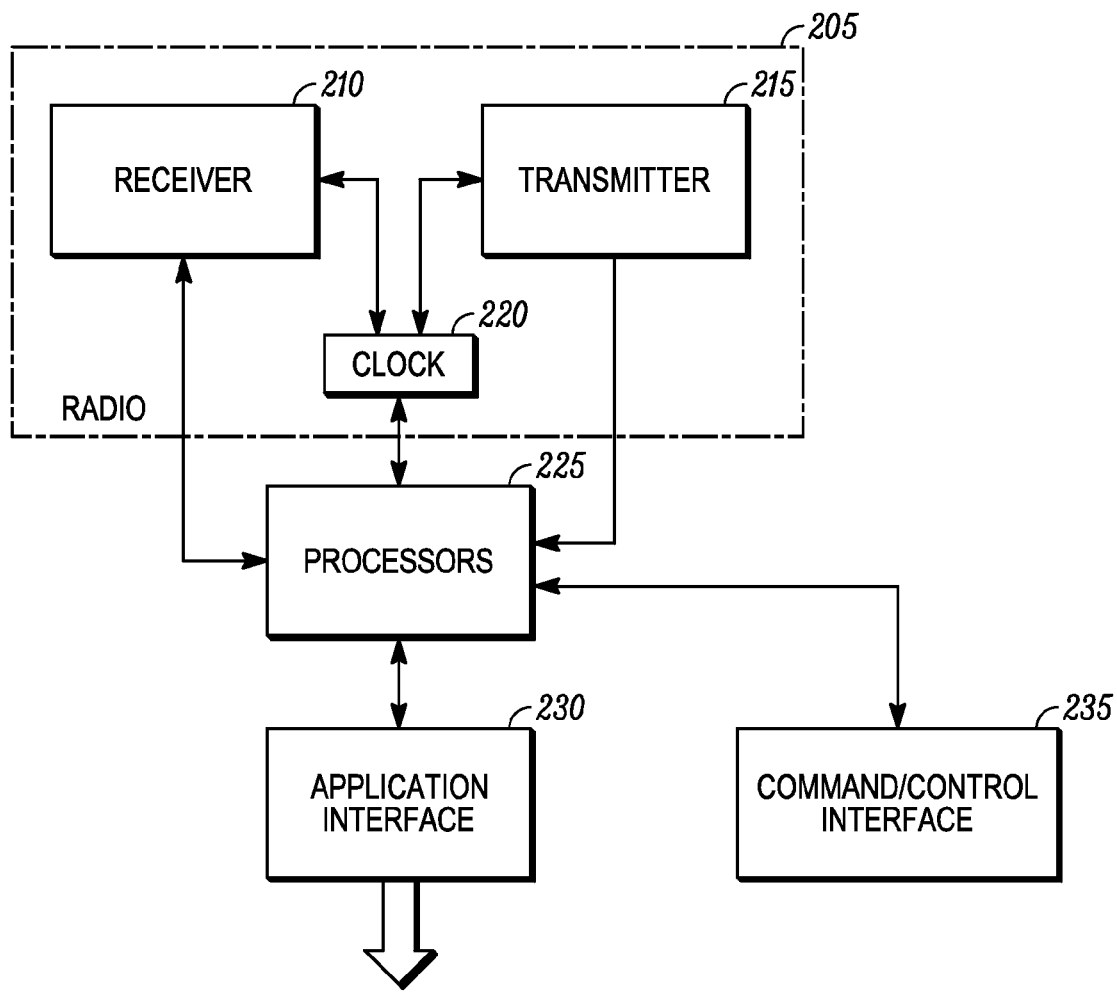
FIG. 2 is a block diagram illustrating an example of a wireless device for operation with the network shown in FIG. 1 for which some embodiments may function.

FIG. 2 is an electronic block diagram of one embodiment of a node 200 in which some embodiments of the present invention can function. The node 200, for example, can exemplify one or more of the nodes 102, 106, or 107 of FIG. 1. As illustrated, the node 200 includes a radio module 205, one or more processors 225, an application interface 230, and a command/control interface 235.

The node 200, for example, can be an integrated unit containing at least all the elements depicted in FIG. 2, as well as any other elements necessary for the mobile node 200 to perform its particular functions. Alternatively, the node 200 can comprise a collection of appropriately interconnected units or devices, wherein such units or devices perform functions that are equivalent to the functions performed by the elements of the node 200. For example, the node 200 may comprise a laptop computer coupled to a wireless local area network (WLAN) card.

As illustrated, a radio module 205 of the node 200 includes a receiver 210, a transmitter 215 and a clock 220. An antenna (not shown) intercepts transmitted signals from one or more nodes 102, 106, 107 within the network 100 and transmits signals to the one or more nodes 102, 106, 107 within the network 100. The antenna is coupled to the transmitter 215 and receiver 210, which each employ conventional modulation and demodulation techniques for transmitting and receiving communication signals, such as packetized signals, to and from the node 200 under the control of the processors 225. The packetized data signals can include, for example, voice, data or multimedia information, and packetized control signals, including node update information. When the transmitter 215 receives a command from the processors 225, the transmitter 215 sends a signal via the antenna to one or more devices within the network 100. In an alternative embodiment (not shown), the node 200 includes a transceiver comprising both a receiver and a transmitter. It will be appreciated by one of ordinary skill in the art that other similar electronic block diagrams of the same or alternate type can be utilized for the node 200. The radio module 205 coupled to the antenna can operate, for example, over an ad hoc networking air interface (e.g., Bluetooth, 802.11 networking, 802.16 or 802.16e WiMAX (Worldwide Interoperability for Microwave Access), and the like).

The implementation of the radio module 205 depends on the implementation of the node 200. For example, the radio module 205 can be implemented as an appropriate wireless modem, or as conventional transmitting and receiving components of two-way wireless communication devices. In the event that the radio module 205 is implemented as a wireless modem, the modem can be internal to the node 200 or insertable into the node 200 (e.g., embodied in a wireless radio frequency (RF) modem implemented on a Personal Computer Memory Card International Association (PCMCIA) card). For a wireless communication device, the radio module 205 can be implemented as part of the wireless device hardware and software architecture in accordance with known techniques. Most, if not all, of the functions of the radio module 205 can be implemented in a processor, such as the processors 225. However, the processors 225 and the radio module 205 have been partitioned based on their functionality, not on physical structure herein to facilitate a better understanding of performed operations.

Coupled to the radio module 205, is the processors 225 utilizing conventional signal-processing techniques for processing received signals. At the interface between the receiver 210, the transmitter 215 and the processors 225, information is presented as quadrature (complex I, Q signal). The Time Of Arrival (TOA) of a received message is measured with the clock 220 that runs continuously. The clock 220 counts ticks and restarts from zero when overflows. The duration of the clock tick is the same as the duration of an analog to digital converter (A/D) converter (not shown) sampling time providing the (I, Q) samples. The number of bits of the clock register is large enough for counting, without causing overflow, the duration of the maximum signal propagation time. If the node 200 can communicate at a maximum distance of two kilometers (2 Km), for example, the duration of the signal propagation time is six microseconds (6 µs). Supposing that the duration of the clock tick is twenty nanoseconds (20 ns), the clock register must have at least eleven (11) bits that will cause the register to overflow every 40.96 µs. The clock 220 interacts with the receiver 210 and the transmitter 215. When the receiver 210 has identified the arrival of a message, it transfers the content of the clock register to the processors 225 as approximate time of arrival (TOA). When the processors 225 submit a message to be transmitted, the transmission is held until the clock value has reached the preset transmit time.

The processors 225 are responsible for performing computations using, for example, several Digital signal processing (DSP) processors. The DSP processors can operate in parallel, sharing the same memory. They perform the computation associated with transferring regular data and for supporting Location Services.

The radio module 205 and the processors 225 are the components of the basic wireless device. As described in FIG. 1, a group of devices with this basic configuration can communicate one with another, can associate in a wireless network and can transport information across network from hop to hop. The basic configuration is used on terminals that are responsible only for providing the connectivity between other network nodes, therefore have only data routing capability (wireless routers).

The optional application interface 230 provides the connectivity between the array of DSP processors and an external computer such as a laptop, a personal digital assistant (PDA) or a desktop computer. The application interface 230 can be either serial, parallel or a memory bus, running proprietary or standard protocols. Applications running on an external computer use the application interface 230 for accessing data transferred in the wireless network as well as communicating with Location Services. The application interface 230 is used for setting the parameters of Location Services as well as for querying Location Services about location of the node 200, the positions of neighbor nodes to the node 200, and the relative moving speed of the node 200 in relation with neighbor nodes.

The optional command/control interface 235 can be used for connecting sensors that measure temperature, pressure, speed, flow, position of switches, chemical composition, and the like, as well as for connecting electromagnetic valves and switches for remotely controlling a process or an operational facility.

Figure 3:
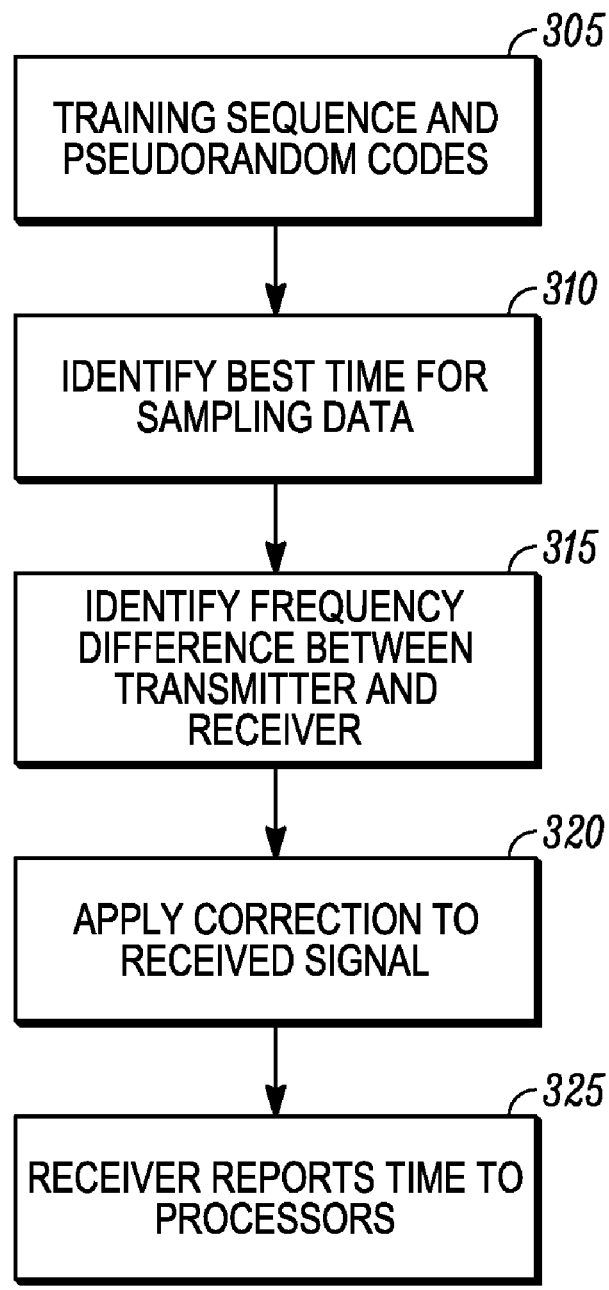
FIG. 3 is a flowchart illustrating a communication operation between two wireless devices operating in the network of FIG. 1 in accordance with some embodiments.

FIG. 3 is a flowchart illustrating at least a portion of a communication operation 300 between two wireless devices such as two nodes 102, 106, 107 of FIG. 1. As illustrated, the communication operation 300 begins at Step 305 with a training sequence and two pseudorandom codes. The training sequence is used for automatic gain control, frame detection and base-band signal phase and carrier frequency error. The pseudorandom codes provide the radio channel impulse response.

The peak in the cross-correlation of the received pseudorandom codes and stored reference allows the identification of the best time for sampling the data at Step 310. The phase difference between the maximum value of the cross-correlation provided by the first and the second code is used for identifying the apparent difference of frequencies between the transmitter node and the receiver node at Step 315. Once it is identified, the receiver 210 applies the correction to the reception on the received signal at Step 320. The apparent difference of frequency is caused by the real difference of frequencies of the transmitter and receiver oscillators and the relative movement of the two devices, also known as Doppler Effect.

Next, at Step 325, the receiver 210 reports to Processors 225 the time, measured with the local clock 220, when the autocorrelation has achieved the maximum value, that is also known as the approximate Time Of Arrival (TOA) of the message, and the size of the approximate difference between the local and signal frequencies.

For supporting very high precision of Location Services, two additional messages, RANGE and LOCATION, are added to the traditional protocol implemented in wireless networks. Both messages are used for broadcasting information to neighbors.

Figure 4:
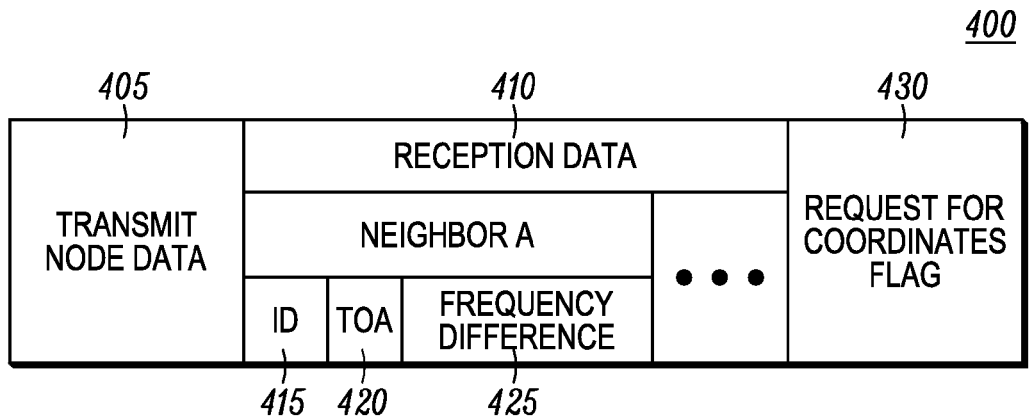
FIGS. 4 through 6 illustrate various messages used in the operation of some embodiments of the present invention.

FIG. 4 illustrates and example LOCATION message 400 in accordance with some embodiments. The LOCATION message 400 is used for broadcasting data 405 about the node transmitting the message and reception data 410 about the reception of RANGE messages from neighbors. The reception data 410, for example, contains for each neighbor, the neighbor identification 415, the TOA 420 of the last RANGE message received from that neighbor, the apparent difference of frequencies 425 between the host and the neighbor and one bit flag. The LOCATION message also includes a "Request for coordinates" flag 430, which is set to TRUE when the host terminal needs to compute its own position and does not have enough references.

Figure 5:
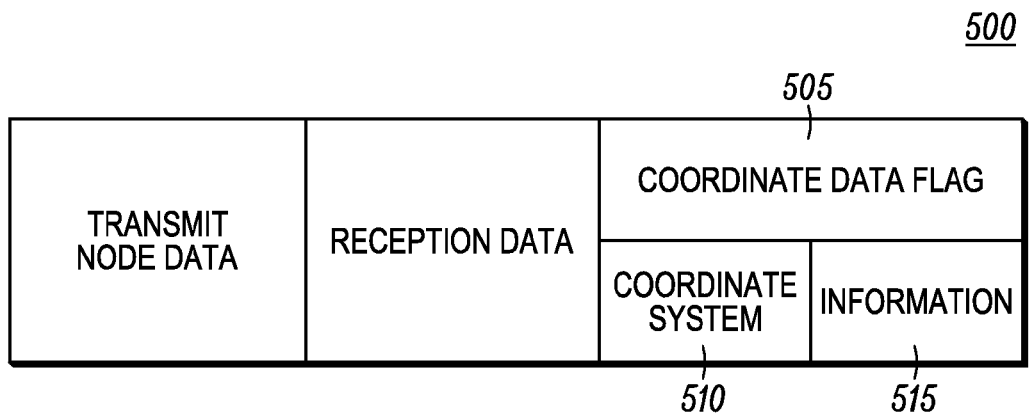

When a node receives the "Request for coordinates" from any other neighbor, it transmits in the next LOCATION message 500 of FIG. 5, a COORDINATE DATA flag 505 specifying the system of coordinates 510 followed by the proper information 515. The COORDINATE DATA flag 505 has one of the following values:

No coordinates (when the node does not have known or computed coordinates or it is not required to transmit coordinates at this time)
Geocentric
Geographic
Local (X, Y, Z and the identification of station used as origin)
Relative (identifications of three stations used as references)

It will be appreciated that when the list of neighbors is too large to fit in one LOCATION message 400, the node will broadcast only the TOA 420 and frequency differences 425 of the closest neighbors.

Location Services operate on wireless devices such as the node 200 described previously herein. These devices are able to identify the approximate TOA and frequency difference of any received message. The precision of TOA so measured is appropriate for identifying the sample timing providing the best reception, while the frequency difference is satisfactory for locking the receiver to the received signal.

The best timing is associated with the arrival of the signal carrying the highest energy. Due to reflections, the signal traveling from transmitter to receiver follows more than one path and, in most of the cases, the path carrying the highest energy is not the path following the straight line.

The strengths of the received direct and indirect signals are affected by several causes, where multiple reflections and media absorption are the most important. In some cases, the direct signal, that follows the straight line connecting the transmitter node with the receiver node, could be affected by much higher attenuation than some of the indirect signals.

As an example, indoor high frequency radio waves (at Industrial, Scientific and Medical (ISM) band) lose less energy when they are reflected by walls compared to going through. Multiple reflections make those signals to travel long distances inside a building while propagating along the hallways and reflecting between floor and ceiling. In the same time, the direct signal needs to penetrate through all the walls that are between transmitter and receiver. After passing through one dry wall, the radio signal at 2.4 Giga Hertz (GHz) ISM band looses about 13 decibels (dB) of energy. Considering that the average distance between two walls is 20 feet, a direct radio signal received at 200 feet distance from transmitter looses, due to absorption caused by wall penetration, about 130 dB of energy.

Figure 6:
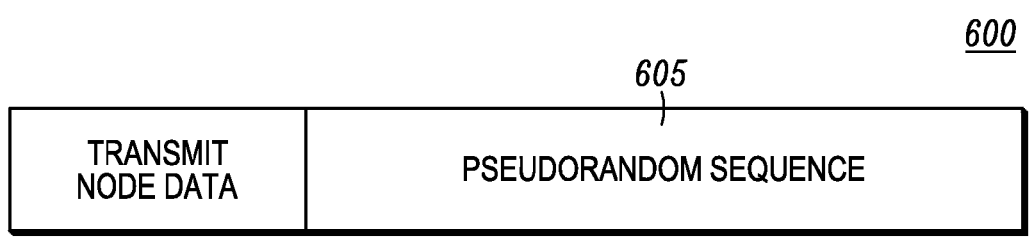

According with the present method, for measuring the TOA, each terminal broadcasts a RANGE message 600 as illustrated in FIG. 6. All RANGE messages 600 have the same content, pseudorandom pn sequence 605 of bits of length n. The pn sequence is transmitted repeatedly for m times, with each bit being transmitted for two successive clock ticks.

Figure 7:
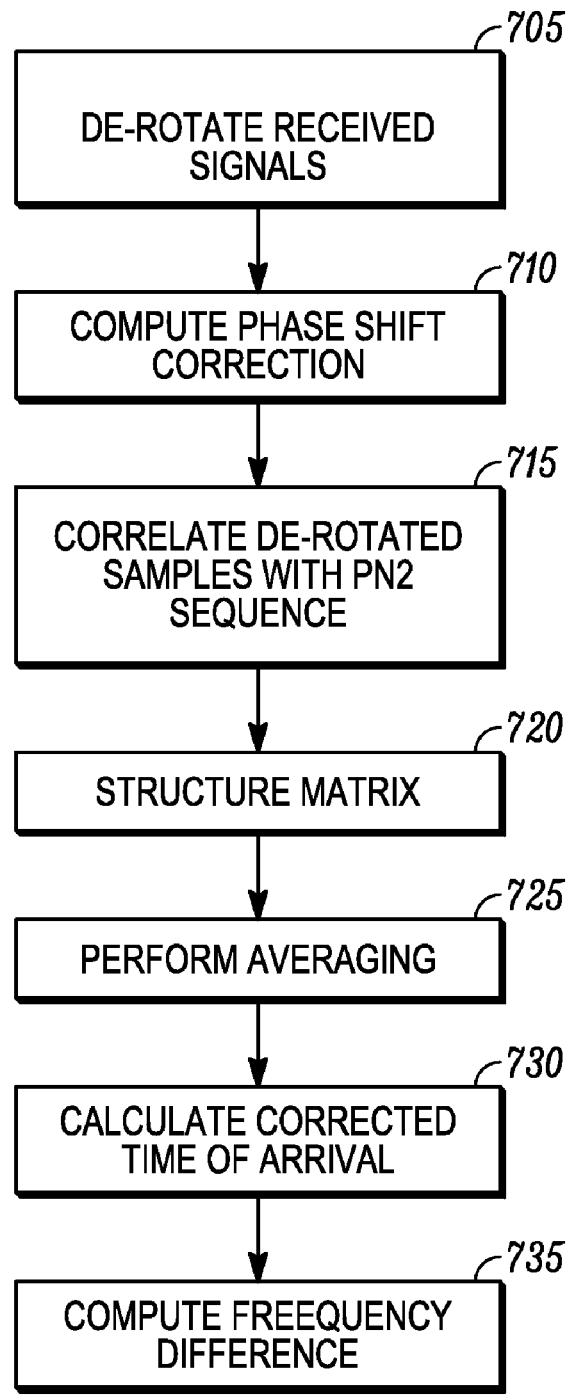
FIG. 7 is a flowchart illustrating an operation of a node operating within the network of FIG. 1 in accordance with some embodiments.

FIG. 7 illustrates the operation of a node upon receiving one or more RANGE messages 600. At the receiving node, the sequence of N=m*2n received quadrature (I, Q) samples, is processed by a DSP as illustrated in the operation 700 of FIG. 7. Beginning with Step 705, the processor de-rotates each received sample. Since I and Q should become identical after de-rotation, only one of them is selected. The result is a vector with N=m*2n components. Next, in Step 710, the processor computes the phase shift correction for one second from the de-rotation angles. Next, in Step 715, the processor correlates the de-rotated samples with the pn2 sequence (each bit is considered twice) using a sliding window of size 2n. The result is a vector with N-2n components.

Next, in Step 720, the processor structures the result as a matrix with m-1 rows and 2n columns. The first 2n elements are placed on the first row of the matrix. Next, in Step 725 the processor averages m-1 matrix elements on each of the 2n columns into a vector with 2n elements. Next, in Step 730, the shifted average vector of 2n elements is processed with the algorithm presented hereinbefore that provides the correction of TOA of the direct path in relation with the TOA measured by hardware. The shift consists in considering the second half of the vector first, then the first half of the vector. Next, in Step 735, the processor computes the frequency difference from the phase shift correction computed in Step 710 and the approximate frequency difference measured by hardware from training sequence in step 315.

A wireless device involved in Location Services transmits and receives the RANGE and LOCATION messages. From received data and from its own measurements, the node can compute the range between any two nodes within the network as described herein. The method uses the frequency difference for computing the TOA at each node in the network at the same moment, thus eliminating all ranging errors caused by network mobility.

The apparent frequency difference measured by a terminal is the summation between the difference of oscillator frequencies and the Doppler Effect.

If the difference of oscillator frequencies between device A and B is $\delta_{AB}$, the difference between B and A oscillators is $\delta_{BA} = -\delta_{AB}$. On the other hand, if the Doppler effect of device A in relation with device B is $D_{AB}$, the Doppler Effect measured by device B is $D_{BA} = D_{AB}$. The Doppler Effect has positive value when the two devices approach each other and a negative value when they move away.

Supposing that A measures an apparent frequency shift in relation with B of $d_{AB}$ and B measures an apparent frequency shift $d_{BA}$ in relation with A, the real difference of frequencies and the Doppler Effect can be computed as follows:

$$\delta_{AB} = -\delta_{BA} = \frac{d_{AB} - d_{BA}}{2}$$

$$D_{AB} = D_{BA} = \frac{d_{AB} + d_{BA}}{2}$$

From the value of the Doppler Effect can be computed the relative speed of the two devices, fact that is very important when Location Services are used in conjunction with Inertial Navigation Systems and for preventing collisions. A negative value of the Doppler Effect indicates that the distance between the two devices is increasing, while a positive value, that the distance is decreasing.

It will be appreciated that a device receiving RANGE and LOCATION messages can compute its own coordinates and the coordinates of neighbors. Depending on the nature of available information, the position of the terminal is computed using one of the methods presented in hereinbefore.

The accuracy of the Time Of Arrival of a message in a wireless ad-hoc multihopping network has an important effect on the accuracy of computed Location of a mobile network node. For indoor propagation, the multipath effect and the absorption of signal energy makes almost impossible the reception of the direct signal and precise computation of the distance between network nodes. With the method provided herein, the direct signal is received at larger distances than it is received with traditional methods, by lowering the noise floor.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for measuring the time of arrival of one or more signals comprising:
   receiving, at a receiving node, at least one signal including a first pseudorandom code and a second pseudorandom code from a transmitting node;
   identifying, at the receiving node, an approximated frequency difference between the receiving node and the transmitting node using a phase difference between each of a maximum value of a cross-correlation provided by the first pseudorandom code and the second pseudorandom code;
   applying, at the receiving node, the approximated frequency difference to the reception of the received signal; and
   calculating, at the receiving node, the approximated time of arrival of the received signal comprising a time, measured with a local clock, when the cross-correlation has achieved the maximum value.

2. The method of claim 1, wherein the transmitting node sends the at least one signal as one or more RANGE messages each including a pseudorandom code repeatedly for a plurality of times.

3. The method of claim 1, further comprising prior to receiving the signal:
   broadcasting, by the receiving node, a LOCATION message including a "Request for Coordinates" flag set to TRUE to notify the transmitting node that the receiving node requires references for computing its own position.

4. The method of claim 3, further comprising:
   receiving, by the receiving node, data associated with reception of RANGE messages from one or more neighbor nodes.

5. The method of claim 4, wherein the received data comprises, for each neighbor: a neighbor identification, a time of arrival of a last RANGE message received from that neighbor node, an apparent difference of frequencies between the receiving node and the neighbor node, and a one bit COORDINATE DATA flag.

6. The method of claim 5, wherein the COORDINATE DATA flag value is selected from a group of values comprising: no coordinates, Geocentric, Geographic, Local, and Relative.

7. The method of claim 2, wherein the received RANGE signals comprise a sequence of received quadrature (I, Q) samples, the method further comprising operating the receiving node to:
   de-rotate each received sample thereby resulting in a vector of components;
   compute a phase shift correction from at least one de-rotation angle of the de-rotated samples;
   correlate the de-rotated samples with a pseudorandom code sequence;
   structure the result of correlation as a matrix comprising a plurality of matrix elements arranged with a plurality of rows and a plurality of columns;
   average at least some of the matrix elements on each of the columns into a vector of elements;
   process the averaged vector of elements for identifying a best correction of time of arrival of a direct path in relation with the approximated time of arrival measured by the node;

compute the frequency difference from the phase shift correction and the approximated frequency difference; and compute the Doppler frequency shift between at least two neighboring nodes.

8. The method of claim 7, wherein a shift considers a second half of the vector first, and further wherein a first half of the vector is considered during the processing the shifted average vector step.

9. The method of claim 7, further comprising operating the receiving node to:

compute a relative speed between the at least two neighboring nodes from the Doppler frequency shift.

* * * * *

UNITED STATES PATENT AND TRADEMARK OFFICE
CERTIFICATE OF CORRECTION

PATENT NO.       : 8,130,146 B2
APPLICATION NO.  : 12/181727
DATED            : March 6, 2012
INVENTOR(S)      : Belcea et al.

Page 1 of 1

It is certified that error appears in the above-identified patent and that said Letters Patent is hereby corrected as shown below:

In Fig. 7, Sheet 5 of 5, for Tag "735", in Line 1, delete "FREEQUENCY" and insert
-- FREQUENCY --, therefor.

In Column 12, Lines 5-6, in Claim 9, delete "compute a relative.......shift." and insert the same at Line 3.

Signed and Sealed this
Eighteenth Day of December, 2012

David J. Kappos
*Director of the United States Patent and Trademark Office*